United States Patent
DeSoto et al.

(10) Patent No.: US 10,963,862 B2
(45) Date of Patent: *Mar. 30, 2021

(54) LOGIN USING QR CODE (71) Applicant: PAYPAL, INC., San Jose, CA (US)

(72) Inventors: Daniel B. DeSoto, Round Rock, TX (US); Mark Andrew Peskin, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/708,230

(22) Filed: Dec. 9, 2019

(65) Prior Publication Data

US 2020/0175494 A1 Jun. 4, 2020

Related U.S. Application Data (63) Continuation of application No. 15/042,583, filed on Feb. 12, 2016, now Pat. No. 10,504,103, which is a (Continued)

(51) Int. Cl.
*G06F 21/45* (2013.01)
*G06F 21/62* (2013.01)
(Continued)

(52) U.S. Cl.
CPC ....... *G06Q 20/3274* (2013.01); *G06Q 20/202* (2013.01); *G06Q 20/4014* (2013.01);
(Continued)

(58) Field of Classification Search
CPC ............ G06Q 20/3274; G06Q 20/202; G06Q 20/4014; H04L 63/08; H04L 63/10; H04W 12/06; H04W 12/00522
See application file for complete search history.

(56) References Cited

U.S. PATENT DOCUMENTS 7,194,618 B1 3/2007 Suominen
7,314,167 B1 1/2008 Kiliccote
(Continued)

OTHER PUBLICATIONS

A Novel User Authentication Scheme Based on QR-Code. Liao. Academy Publisher. (Year: 2010).*
(Continued)

*Primary Examiner* — Venkat Perungavoor
(74) *Attorney, Agent, or Firm* — Haynes and Boone, LLP (57) ABSTRACT

Systems and methods are disclosed herein for a user to use a trusted device to provide sensitive information to an identity provider via QR (Quick Response) code for the identity provider to broker a website login or to collect information for the website. A user may securely transact with the website from unsecured devices by entering sensitive information into the trusted device. The identity provider may generate the QR code for display by the website on an unsecured device. A user running an application from the identity provider on the trusted device may scan the QR code to transmit the QR code to the identity provider. The identity provider may validate the QR code and may receive credential information to authenticate the user or may collect information for the website. Advantageously, the user may perform a safe login to the website from untrusted devices using the trusted device.

20 Claims, 7 Drawing Sheets

Related U.S. Application Data continuation of application No. 14/557,646, filed on Dec. 2, 2014, now Pat. No. 9,288,198, which is a continuation of application No. 13/768,336, filed on Feb. 15, 2013, now Pat. No. 8,935,777.

(60) Provisional application No. 61/621,823, filed on Apr. 9, 2012, provisional application No. 61/600,444, filed on Feb. 17, 2012.

(51) Int. Cl.

| | | |
|---|---|---|
| *G06Q 20/32* | (2012.01) | |
| *H04L 29/06* | (2006.01) | |
| *H04W 12/06* | (2021.01) | |
| *G06Q 20/20* | (2012.01) | |
| *G06Q 20/40* | (2012.01) | |
| *H04W 12/08* | (2009.01) | |
| *H04W 12/00* | (2021.01) | |

(52) U.S. Cl.
CPC .............. *H04L 63/08* (2013.01); *H04L 63/10* (2013.01); *H04W 12/06* (2013.01); *H04W 12/00522* (2019.01)

(56) References Cited

U.S. PATENT DOCUMENTS

| | | |
|---|---|---|
| 8,261,089 B2 | 9/2012 | Leon Cobos et al. |
| 8,272,038 B2 | 9/2012 | Husemann et al. |
| 2003/0097444 A1 | 5/2003 | Dutta et al. |
| 2005/0203854 A1 | 9/2005 | Das et al. |
| 2007/0114274 A1 | 5/2007 | Gibbs et al. |
| 2008/0046366 A1 | 2/2008 | Bemmel et al. |
| 2008/0320566 A1 | 12/2008 | Herzog et al. |
| 2009/0187492 A1 | 7/2009 | Hammad et al. |
| 2010/0107229 A1 | 4/2010 | Najafi et al. |
| 2010/0211506 A1 | 8/2010 | Chang et al. |
| 2010/0257366 A1 | 10/2010 | Leclercq et al. |
| 2011/0055547 A1* | 3/2011 | Lee .................. H04L 63/18 713/150 |
| 2011/0119156 A1 | 5/2011 | Hwang et al. |
| 2011/0137742 A1 | 6/2011 | Parikh |
| 2011/0137797 A1 | 6/2011 | Stals et al. |
| 2011/0270751 A1 | 11/2011 | Csinger et al. |
| 2011/0307318 A1 | 12/2011 | LaPorte et al. |
| 2012/0006891 A1 | 1/2012 | Zhou et al. |
| 2012/0054109 A1 | 3/2012 | Selsby |
| 2012/0123924 A1 | 5/2012 | Rose et al. |
| 2012/0130889 A1 | 5/2012 | Lyons et al. |
| 2012/0205436 A1* | 8/2012 | Thomas ............ G06K 17/0025 235/375 |
| 2012/0209688 A1 | 8/2012 | Lamothe et al. |
| 2012/0209749 A1 | 8/2012 | Hammad et al. |
| 2012/0266224 A1 | 10/2012 | Gruschka et al. |
| 2012/0290415 A1 | 11/2012 | Itwaru |
| 2012/0290838 A1 | 11/2012 | Lee |
| 2013/0185210 A1 | 7/2013 | Dodson et al. |
| 2014/0225711 A1* | 8/2014 | Warrier .................. G05B 19/02 340/5.51 |
| 2016/0189137 A1 | 6/2016 | Zhou et al. |

OTHER PUBLICATIONS

Vapen et al., "2-clickAuth—Optical Challenge-Response Authentication", International Conference on Availability, Reliability, and Security, 2010, pp. 79-86, IEEE.

Rusli et al., Regular expression patterns for searching trust attributes in e-Commerce Website, Recent Advances in Artificial Intelligence, Knowledge Engineering and Data Bases (Year 2010).

\* cited by examiner

LOGIN USING QR CODE

CROSS-REFERENCE TO RELATED APPLICATIONS

The present application is a continuation of U.S. patent application Ser. No. 15/042,583, filed Feb. 12, 2016, which is a continuation of U.S. patent application Ser. No. 14/557,646, filed Dec. 2, 2014, now U.S. Pat. No. 9,288,198, issued on Mar. 15, 2016, which is a continuation of Ser. No. 13/768,336, filed Feb. 15, 2013, now U.S. Pat. No. 8,935,777, issued on Jan. 13, 2015, which claims priority to and benefit of U.S. Provisional Patent Application Ser. No. 61/600,444, filed on Feb. 17, 2012, and U.S. Provisional Patent Application Ser. No. 61/621,823, filed on Apr. 9, 2012, all contents of which are hereby incorporated by reference in their entirety.

TECHNICAL FIELD

The present disclosure relates generally to systems and methods for authenticating users over a computer network. In particular, the present disclosure relates to methods and systems for using trusted devices to broker secure logins into websites from devices that may be insecure.

BACKGROUND

Internet users are frequently asked to login to websites from publicly shared devices. These devices may be inherently insecure as they may be infected with malware, or otherwise compromised by key-logger spyware, etc. Users entering their login credentials into unsecure devices face the risk of exposing their login credentials to unauthorized parties. Thus, there is a need for users to login to websites without entering sensitive information on insecure devices. Even when the devices are secure, there are situations where it may be difficult for users to manually enter credentials into the devices, such as on devices with limited input capabilities. While systems have been proposed to more securely authenticate users, these systems may require special hardware such as biometrics readers or near field communication (NFC) devices. In addition, even NFC devices may be compromised to expose sensitive information. To increase security, some websites may implement secondary authentication mechanism such as requiring users to use fobs or other second factor devices. However, these devices are inconvenient for users to carry. Accordingly, it is desirable to provide ways to users to login to websites securely, conveniently, and efficiently.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Systems and methods are disclosed herein for a user to use a trusted device to provide sensitive information to an identity provider via QR (Quick Response) code for the identity provider to broker a login to a website or to assist in the authentication of the user by the website. The identity provider may be a service provider that facilitates transactions between the user and the website. Users may securely transact with the website from unsecured devices without the risk of exposing sensitive information to unauthorized parties running malware or key logger spyware on the unsecured devices. The QR code may be generated by the identity provider when the website desires to obtain sensitive information from users. The website may display the QR code on the unsecured devices. A user running a trusted application from the identity provider on the trusted device may scan the QR code to transmit the QR code to the identity provider. The identity provider may validate the QR code and prompt the user for the sensitive information. The identity provider may validate the QR code and may evaluate a trust level of the user to generate a security token based on the type of sensitive information received and/or the level of authentication performed on the user. The identity provider may provide the security token to the website for the website to display protected resources corresponding to the security token on the unsecured devices. Advantageously, the user may perform a safe login to the website from untrusted devices such as publicly shared devices.

The systems and methods disclosed may be used as a second factor authentication even after the user has entered login information directly into the unsecured devices. For example, the website may, through the identity provider, perform additional authentication of the user via QR code to increase the trust level of the user so as to prevent logins by fraudsters. The website may request the identity provider to generate QR code to prompt the user to provide information for the second factor authentication. The website may display the QR code on the unsecured devices. A user running a trusted application from the identity provider on the trusted device may scan the QR code for transmission to the identity provider. The identity provider may validate the QR code and may prompt the user for the information. The identity provider may evaluate the trust level of the user based on the credentials entered into the trusted device when the user logs into the identity provider, on the characteristics of the trusted device, and/or on other information entered by the user. The identity provider may generate a security token based on the level of trust of the user. The website may use the security token to guard against unauthorized logins. Advantageously, the user may avoid the need to carry second factor devices such as fobs for websites that implement second factor authentication mechanism when logging in from untrusted devices.

The systems and methods disclosed may also be used to securely collect additional sensitive information or credentials from the user even after the user has logged into the website on the unsecured device. For example, the website may request the identity provider to generate additional QR code when the website desires to collect additional sensitive information from the user when the user is already logged in. The website may request the identity provider to generate QR code to prompt the user to provide the additional information. The website may display the QR code on the unsecured devices. A user running a trusted application from the identity provider on the trusted device may scan the QR code for transmission to the identity provider. The identity provider may validate the QR code and may prompt the user for the information. The user may enter the requested information through the trusted application on the trusted device. The identity provider may collect and provide the information to the website. In one or more embodiments, if the user is connected to the identity provider through the trusted app, the website may request the identity provider to directly prompt the user for the additional information without going through the QR code. Advantageously, the user may securely enter sensitive information to the website anytime during a login session when conducting transactions with the website from untrusted devices.

Advantageously, the user may securely access websites from devices that may be unsecure, or have no or limited input capabilities. Security is enhanced because the user is not required to enter login credentials or other sensitive information into the unsecured devices that may be stolen, seen, or copied. The QR code itself does not need to contain an URL of the website, but may be encrypted to contain just enough information to uniquely identify the website and to tie the transactions together. The trusted application from the identity provider running on the trusted device and the identity provider provide a bridge through which the user may provide sensitive information to the website securely, conveniently, and efficiently.

In accordance with one or more embodiments of the present disclosure, a method is disclosed. The method includes generating by an identity provider a code for display by a website on an untrusted device. The identity provider uses the code to broker a transaction with the website. The method also includes receiving by the identity provider from a trusted device credential information to identity a user. The method further includes authenticating the user using the credential information. The method further includes receiving by the identity provider the code from the trusted device. The method further includes validating the received code. The method further includes generating by the identity provider information to enable the website to perform the transaction with the user on the untrusted device. The method further includes providing the information from the identity provider to the website.

In accordance with one or more embodiments of the present disclosure, a method is disclosed. The method includes requesting by a website a code from an identity provider, where the code is used by the identity provider to broker a transaction of a user with the website. The method also includes receiving by the website the code from the identity provider. The method further includes displaying the code on an untrusted device. The method further includes receiving by the website transactional information from the identity provider. The transactional information is generated by the identity provider based on information received from a trusted device. The method further includes performing by the website the transaction using the transactional information.

In accordance with one or more embodiments of the present disclosure, an apparatus is disclosed. The apparatus includes a network interface. The network interface is used to communicate with a website server and other devices over a network. The apparatus also includes a code generation unit. The code generation unit is used to generate a code for display by the website server on an untrusted device. The code is used to by the apparatus to broker a transaction with the website. The apparatus further includes an authentication and trust services unit. The authentication and trust services unit is used to receive credential information to identity a user from a trusted device. The authentication and trust services unit is also used to authenticate the user from the credential information. The authentication and trust services unit is further used to receive the code from the trusted device. The authentication and trust services unit is further used to validate the code. The authentication and trust services unit is further used to generate information for the website server to enable the website server to perform the transaction with the user on the untrusted device.

Figure 1:
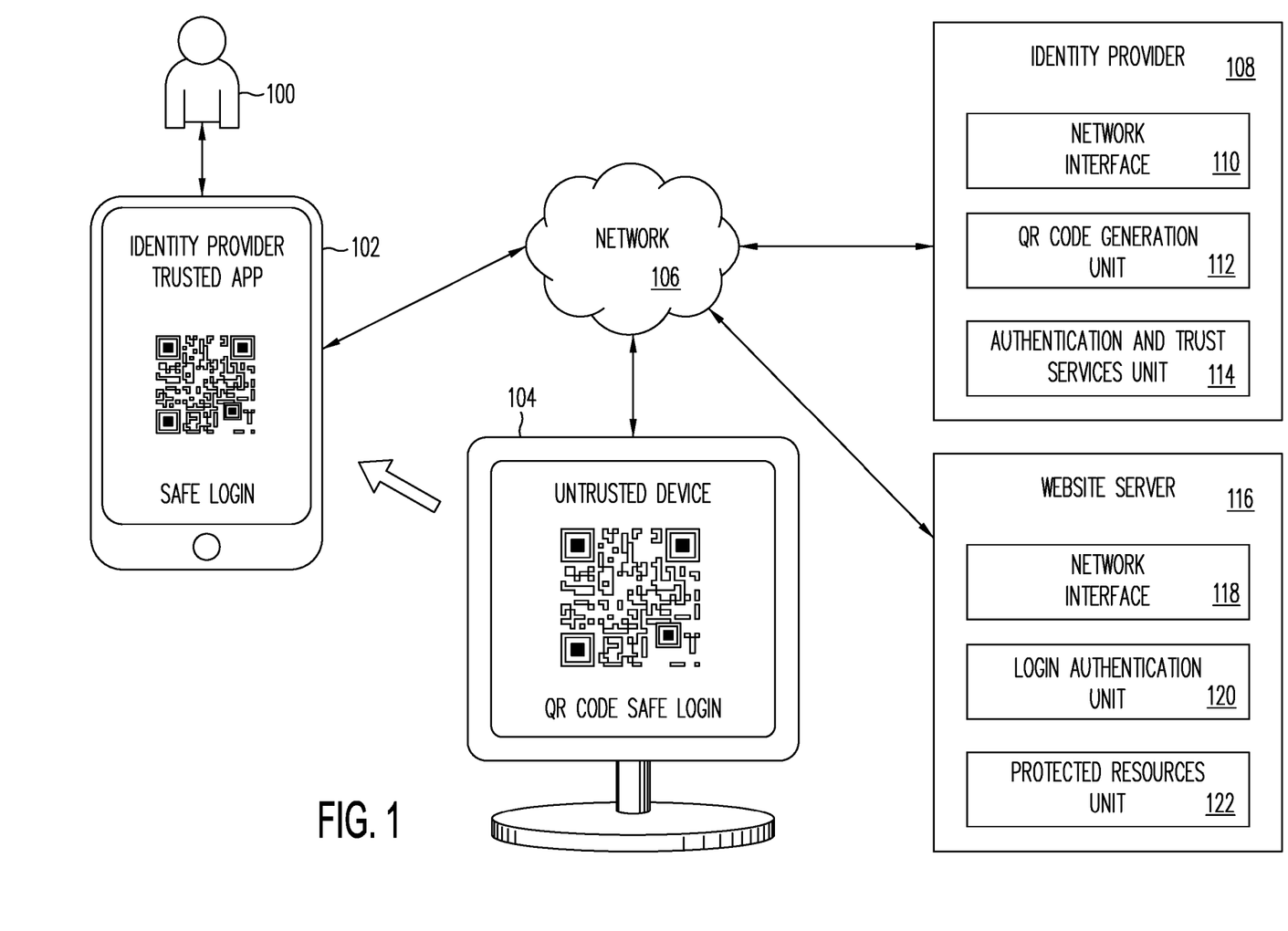
FIG. 1 shows a system for a user to use a trusted device to scan QR code displayed on a display of an untrusted device to supply sensitive information to an identity provider for the identity provider to broker a login to a website according to one or more embodiments of the present disclosure.

Refer now to the figures wherein the drawings are for purposes of illustrating embodiments of the present disclosure only, and not for purposes of limiting the same. FIG. 1 shows a system for a user to use a trusted device to scan QR code displayed on a display of an untrusted device to supply sensitive information to an identity provider for the identity provider to broker a login to a website according to one or more embodiments of the present disclosure.

A user 100 carries a trusted device 102. Trusted device 102 may be a smart phone (e.g., iPhone, Google phone, or other phones running Android, Window Mobile, or other operating systems), a tablet computer (e.g., iPad, Galaxy), personal digital assistant (PDA), a notebook computer, or various other types of wireless or wired computing devices. It should be appreciated that trusted device 102 may be referred to as a mobile device without departing from the scope of the present disclosure. Trusted device 102 may have a camera. Trusted device 102 may communicate over a network 106 with an identity provider 108. A website server 116 hosts a website and may also communicate with identity provider 108 over network 106. The website may be operated by a financial institution, a merchant, or other entities providing secured access to authorized users. In one embodiment, identity provider 108 may broker a login session to website server 116 by user 100.

Network 106 may be implemented as a single network or a combination of multiple networks. For example, in various embodiments, network 106 may include the Internet and/or one or more intranets, wireless networks (e.g., cellular, wide area network (WAN), WiFi hot spot, WiMax, personal area network (PAN), Bluetooth, etc.), landline networks and/or other appropriate types of communication networks. As such, in various embodiments, trusted device 102 may be associated with a particular link (e.g., a link, such as a URL (Uniform Resource Locator) to an IP (Internet Protocol) address).

In one or more embodiments, user 100 is at an untrusted device 104 and wishes to access the website on website server 116. Untrusted device 104 may be a publicly shared device whose security is unknown. To eliminate the risk of exposing sensitive information when such information is entered directly onto untrusted device 104, trusted device 102 and identity provider 108 may be used to broker access to website server 116.

To broker access to website server 116 by user 100, identity provider 108 may have a network interface 110 that interfaces with network 106 to communicate with trusted device 102 and website server 116. A QR code generation unit 112 of identity provider 108 may generate QR code when requested by website server 116. The QR code may not contain an URL of website server 116, but may encrypt information to allow identity provider 108 to uniquely identify website server 116 and to enable identity provider 108 to associate user 100/trusted device 102 with a login session or a transaction on website server 116. For example, QR code may encode information to prompt user 100 to initiate a safe login session to website server 116, or to prompt user 100 to provide information required to complete a transaction by website server 116. The QR code generated by identity provider 108 is not readable by standard QR code readers and the encrypted information may only be decrypted by identity provider 108. Website server 116 may display the QR code on untrusted device 104. While the exemplary embodiments described herein use QR code, identity provider 108 may generate other types of symbol or data encoding schemes, such as UPC code. Website server 116 may similarly display these data encoding schemes on untrusted device 104 for capture or scan by trusted device 102.

To scan the QR code, user 100 may run a trusted app (application) from identity provider 108 on trusted device 102. The trusted app identifies trusted device 102 to identity provider 108 through network 106. The trusted app and trusted device 102 have previously been registered with identity provider 108 by user 100. As such, when the trusted app communicates with identity provider 108, a security level is established for user 100. To increase the security level, in one or more embodiments, user 100 may login to user's account with identity provider 108. User 100 may enter a user name and password such as an e-mail address and a PIN for the login credentials. User 100 may enter the information on trusted device 102 through a keyboard, keypad, touchscreen, or using voice command. User 100 may scan the QR code displayed on untrusted device 104. The trusted application decodes the scanned QR code and transmits the information to identity provider 108. In one or more embodiments, the trusted application may transmit the QR code image to identity provider 108 for decoding.

An authentication and trust services unit 114 of identity provider 108 validates the QR code received from trusted device 102. Identity provider 108 may verify that the QR code identifies a website that has requested identity provider 108 to broker an access, such as from website server 116. Identity provider 108 may also verify that the QR code is associated with a safe login session or with a request by website server 116 to request additional information from user 100 to further authenticate user 100 or to complete a transaction. If website server 116 is requesting additional information, identity provider 108 may transmit a request to trusted device 102 to prompt user 100 to enter the information on trusted device 102. For example, identity provider 108 may request user 100 to provide login credentials to website server 116 for second factor authentication. In one embodiment, trusted device 102 may store the login credentials entered by user 100 so that the login credentials are automatically sent to identity provider 108 for second factor authentication the next time user 100 accesses website server 116. Alternatively, identity provider 108 may request user 100 to provide sensitive information to complete a transaction on website server 116. User 100 may enter the requested information into trusted app for trusted device to transmit the information to identity provider 108

After validating the QR code, authentication and trust servers unit 114 evaluates the security level for user 100/trusted device 102, any additional login credentials received from user 100, and past history of trusted device 102 to determine a level of trust for user 100/trusted device 102. Authentication and trust servers unit 114 may create a security token for user 100 corresponding to the level of trust determined. For example, if user 100 has not logged into identity provider 108 or website server 116, the security token may have a low level of trust for user 100. On the other hand, if user 100 has logged into identity provider 108 and has passed second factor authentication, the security token may have a high level of trust for user 100. Identity provider 108 may store the security token for retrieval by website server 116.

Website server 116 may use a network interface 118 to poll identity provider 108 to detect if a security token has been generated. In one or more embodiments, identity provider 108 may inform website server 116 that a security token is available for retrieval. In one or more embodiments, identity provider 108 may issue an instruction to trusted device 102 directing user 100 how to proceed. For example, when establishing a safe login session, identity provider 108 may direct user 100 to click on the QR code or a "safe login" button on untrusted device 104 to proceed with the login session. When user 100 does as directed, website server 116 may retrieve the security token and may inform user 100 on untrusted device 104 that a login session has been established. A login authentication unit 120 of website server 116 may evaluate the security token to determine the protected resources, if any, that may be accessed by user 100. Website server 116 may access a protected resources unit 122 to display the protected resources on untrusted device 104 for user 100 to access. When the QR code was generated for website server 116 to request additional information from user 100, identity provider 108 may direct user 100 to click on the QR code on untrusted device 104 for website server 116 to retrieve the requested information from identity provider 108. When user 100 does as directed, website server 116 may retrieve the requested information to complete the transaction.

Figure 2:
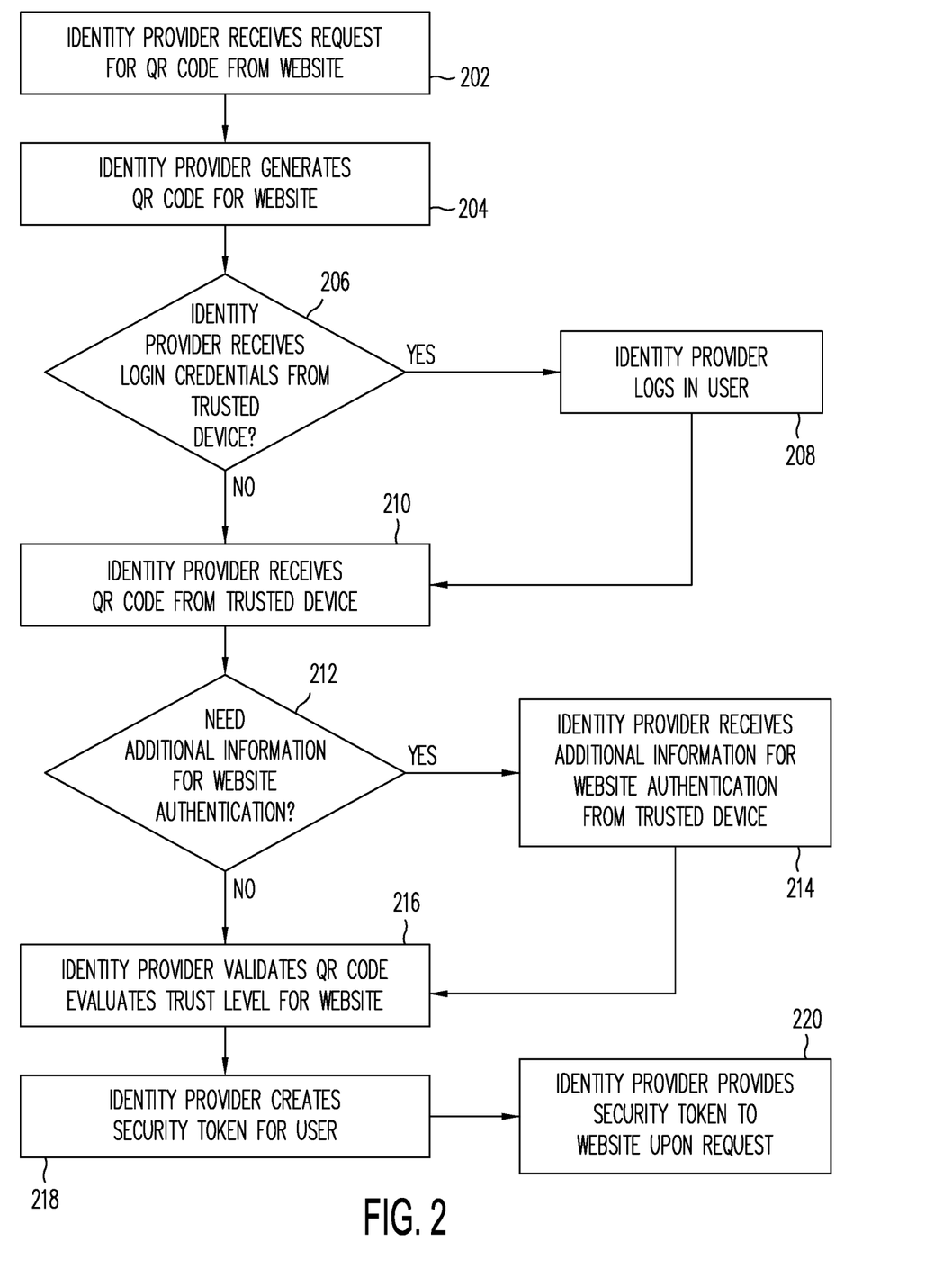
FIG. 2 shows a flow chart of the steps for an identity provider to generate QR code for a website and to validate the QR code received from a trusted device to generate a security token to broker a login to the website according to one or more embodiments of the present disclosure.

FIG. 2 shows a flow chart of the steps for an identity provider of FIG. 1 to generate QR code for a website and to validate the QR code received from a trusted device to generate a security token to broker a login to the website according to one or more embodiments of the present disclosure. In 202, identity provider 108 receives a request for a QR code for a login session from website server 116. The QR code may encrypt information to allow identity provider 108 to uniquely identify website server 116 and to enable identity provider 108 to associate user 100/trusted device 102 with a login session on website server 116. For example, the QR code may contain a key for retrieval of the security token associated with user 100/trusted device 102 for the login session, an identifier for website server 116, and a time stamp. The time stamp may indicate a period of validity of the QR code.

In 204, QR code generation unit 112 of identity provider 108 generates the QR code. QR code generation unit 112 may encrypt an amount of data and size the QR code such that the QR code may be scanned and decoded from a reasonable distance by trusted device 102. To prevent a rogue site from putting up QR code masquerading as QR code generated by identity provider 108 to steal login credentials from user 100, the QR code may be generated to be read only by trusted app from identity provider 108 running on trusted device 102, and not by standard QR code readers. In one or more embodiments, the encoded data may only be decrypted by identity provider 108. In one or more embodiments, the encoded data may be decrypted by the trusted app from identity provider 108. In addition, to mitigate DDOD (Distributed Denial-of-Service) concerns and to ensure that QR code generation does not become a risk to identity provider 108, rate limiting may be implemented on the QR code generation. QR code generation unit 112 may also generate the QR code on a "best effort" basis. If the QR code is generated by a service, there may be a dedicated pool of QR code that is considered best effort.

Identity provider 108 provides the QR code to website server 116 for website server 116 to display the QR code on a login page on untrusted device 104. Website server 116 may also display a "QR code safe login" button on untrusted device 104 to inform users that the QR code is for initiating a safe login. The button may also be clicked by users after identity provider 108 has generated the security token for website server 116 to retrieve the security token from identity provider 108. To scan the QR code, user 100 runs a trusted app from identity provider 108 on trusted device 102. Trusted device 102 has previously been registered with identity provider 108 as belonging to user 100 so that a security level is established for user 100 when trusted app communicates with identity provider 108. The security level is one factor identity provider 108 evaluates when generating the security token for the safe login session. The higher the security level of user 100, the higher the level of trust in the security token generated for user 100, and the more of the protected resources of website server 116 may be accessible by user 100. To increase the security level, user 100 may enter login credentials for identity provider 118 into the trusted app.

In 206, identity provider 108 determines if user 100 has provided login credentials from trusted device 102. If login credentials are received, in 208, identity provider 108 logs in user 100 and increases the security level for user 100. Otherwise, the security level remains unchanged. The trusted app may display a "safe login" icon. User 100 may click on the "safe login" icon to enable the camera on trusted device 102 to scan the QR code displayed on untrusted device 104. The trusted app decodes the scanned QR code and transmits the data to identity provider 108.

In 210, identity provider 210 receives the decoded QR code from trusted device 102. In one or more embodiments, identity provider 210 may receive the un-decoded QR code from trusted device 102. Authentication and trust services unit 114 of identity provider 108 may, if necessary, decode the QR code and may decrypt the decoded data. In 212, identity provider 108 determines if additional information is needed from user 100 for authentication by website server 116. The additional information may include login credentials to website server 116 or may include other sensitive information of user 100. If additional information is needed, identity provider 108 may prompt user 100 for the information on trusted device 102. In 214, identity provider 108 receives the additional information from trusted device 102.

In 216, authentication and trust services unit 114 validates the QR code. Authentication and trust services unit 114 may verify that the time stamp for the QR code has not expired, that the QR code identifies website server 116, and that the key for retrieval of the security token is associated with a safe login session. Authentication and trust services unit 114 also evaluates the security level for user 100, any additional information received from user 102, and history of trusted device 102 to determine a level of trust for user 100. For example, if there is increased security level because user 100 has logged into identity provider 108, user 100 has provided additional information such as login credentials for website server 116, and there is no history of fraudulent use associated with trusted device 102, a high level of trust may be determined for user 100. On the other hand, if there is just a regular security level because user 100 has not logged into identity provider 108, and user 100 has not provided additional information for website server 116, a lower level of trust may be determined for user 100.

In step 218, authentication and trust services unit 114 generates a security token corresponding to the level of trust determined for user 100. Identity provider 108 may inform website server 116 that a security token for a safe login session is available. In one or more embodiments, identity provider 108 may transmit a message to trusted device 102 instructing user 100 to request website server 116 to retrieve the security token. For example, user 100 may be instructed to click on the QR code or the "QR code safe login" button displayed on untrusted device 104. When user 100 clicks on the QR code or the button, website server 116 requests the security token from identity provider 108. In 220, identity provider 108 provides the security token for user 100 to website server 116. Website server 116 may evaluate the security token to establish a login session for user 100 and may present protected resources corresponding to the level of trust of the security token on untrusted device 104 for user 100 to access. In one or more embodiments, identity provider 108 may provide to website server 116 the additional information received from trusted device 102, such as the login credentials to website server 116. Website server 116 may use the additional information to further authenticate user 100 or to determine the protected resources presented to user 100.

Figure 3:
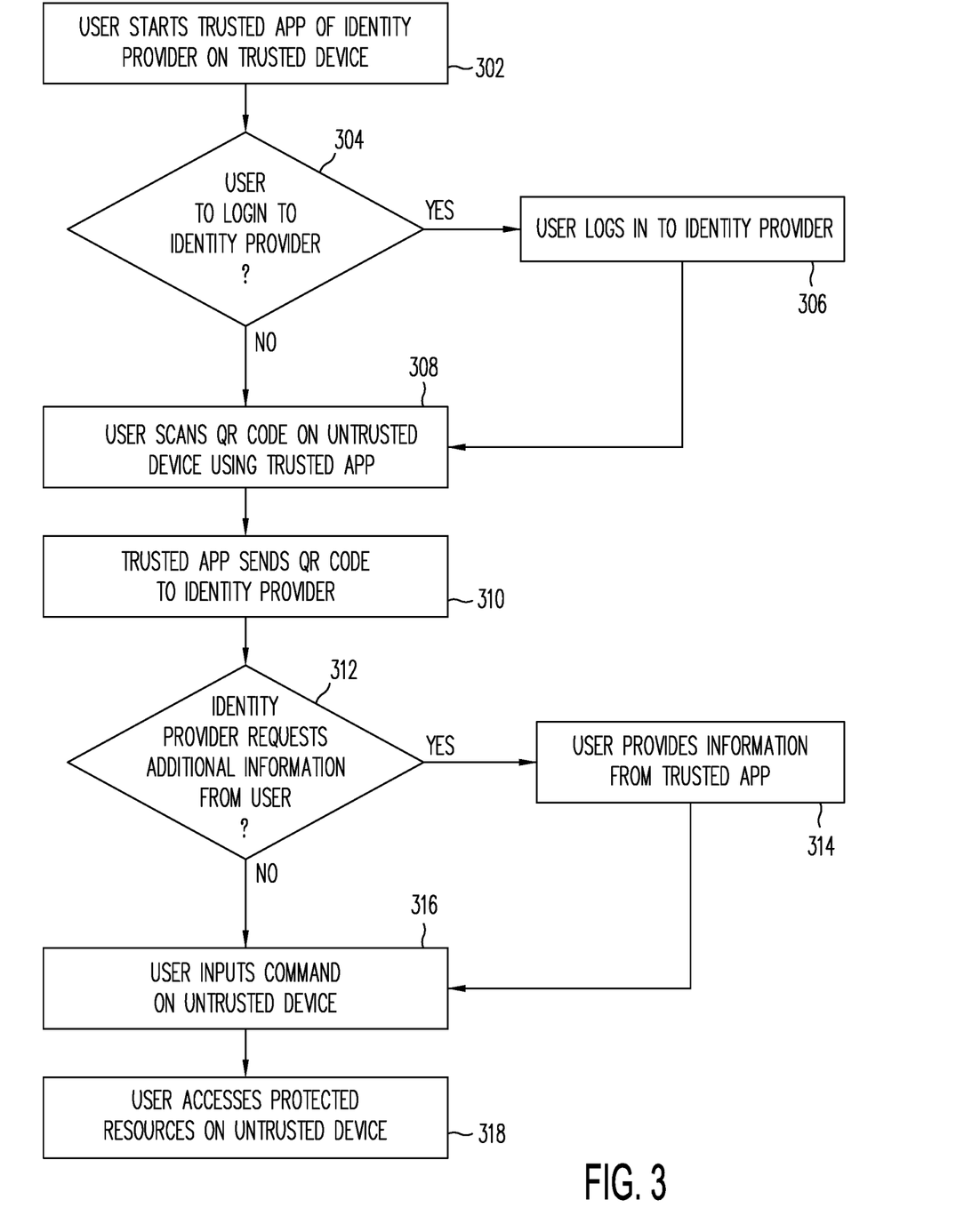
FIG. 3 shows a flow chart of the steps for a user to use a trusted device to scan QR code displayed on an untrusted device to provide sensitive information to an identity provider for the identity provider to broker a login to a website or for the website to request additional information from the user according to one or more embodiments of the present disclosure.

FIG. 3 shows a flow chart of the steps for a user to use a trusted device to scan QR code displayed on an untrusted device of FIG. 1 to provide sensitive information to an identity provider for the identity provider to broker a login to a website or for the website to request additional information from the user according to one or more embodiments of the present disclosure. User 100 may execute the steps of FIG. 3 when user 100 wishes to login to website server 116 at untrusted device 104. User 100 may also execute the steps of FIG. 3 when user 100 is already logged in to website server 116 at untrusted device 104 but website server needs additional information from user 100 to complete a transaction.

In 302, user 100 starts a trusted app from identity provider 108 on trusted device 102. The trusted app may transmit identification information of trusted device 102 to identity provider 108. Trusted device 102 has previously been registered by user 100 with identity provider 108. Therefore, identity provider 108 may associate the transmission from trusted device 102 with user 100 to establish a security level for user 100. To increase the security level, user 100 may login to identity provider 108. In 304, user 100 decides whether to login to user's account with identity provider 108. If the answer is yes, user 100 enters user's login credentials into trusted device in 306. Identity provider 108 may authenticate user 100 to increase the security level.

In 308, user 100 scans the QR code displayed on untrusted device 104 using the trusted app. The QR code may encode information to allow user 100 to request a safe login session with website server 116 or to allow website server 116 to request additional information from user 100 after user 100 is already logged in. User 100 may scan the QR code using the trusted app regardless of whether user 100 has logged in with identity provider 108. The trusted app may decode the QR code or may rely on identity provider 108 to decode the QR code. In 310, trusted app transmits the decoded or un-decoded QR code to identity provider 108. Identity provider 108 may decode and/or decrypt the QR code. Identity provider 108 may validate the QR code to determine whether the QR code is used for a safe login or to obtain additional information from user 100. If the QR code is used for a safe login, additional information may be needed from user 100 for authentication by identity provider 108 or website server 116. For example, the additional information may include login credentials to website server 116. If the QR code is used to obtain additional information from user 100 to complete a transaction, identity provider 108 may determine the type of information needed.

In 312, identity provider 108 determines if it needs additional information from user 100. If it does, identity provider 108 transmits a message to trusted device 102 on the information needed. Trusted device 102 may prompt user 100 to enter the requested information. In 314, user enters the information into trusted app for trusted device 102 to transmit the information to identity provider 108. In one or more embodiments, trusted device 102 may store the entered information so that the information may be provided to identity provider 108 without user input. If trusted device 102 is used to broker a safe login, identity provider 108 may evaluate the security level for user 100, any authentication information received, and history of trusted device 102 to determine the level of trust. Identity provider 108 may generate a security token corresponding to the level of trust. If trusted device 102 is used to provide additional information to website server 116 to complete a transaction after user 100 has already logged in, identity provider 108 may store the additional information.

In 316, trusted device 102 receives a message from identity provider 108 that a security token has been generated or that the requested information has been received. The message may contain instructions directing user 100 how to activate website server 116 to retrieve the security token or the additional information. For example, user 100 may be directed to input a command to website server 116 such as to click on the QR code displayed on untrusted device 104. User 100 inputs the command as directed. Website server 116 retrieves the security token or the additional information from identity provider 108. Website server 116 may establish a safe login session and may display protected resources on untrusted device 104 based on the security token. In 318, user accesses the protected resources through untrusted device 104. In the case where website server 116 obtains additional information for user 100 who is already logged in, website server 116 may use the additional information to complete a transaction. User 100 may proceed to carry out transactions with website server 116 on untrusted device and may close the trusted app on trusted device 102.

Figure 4:
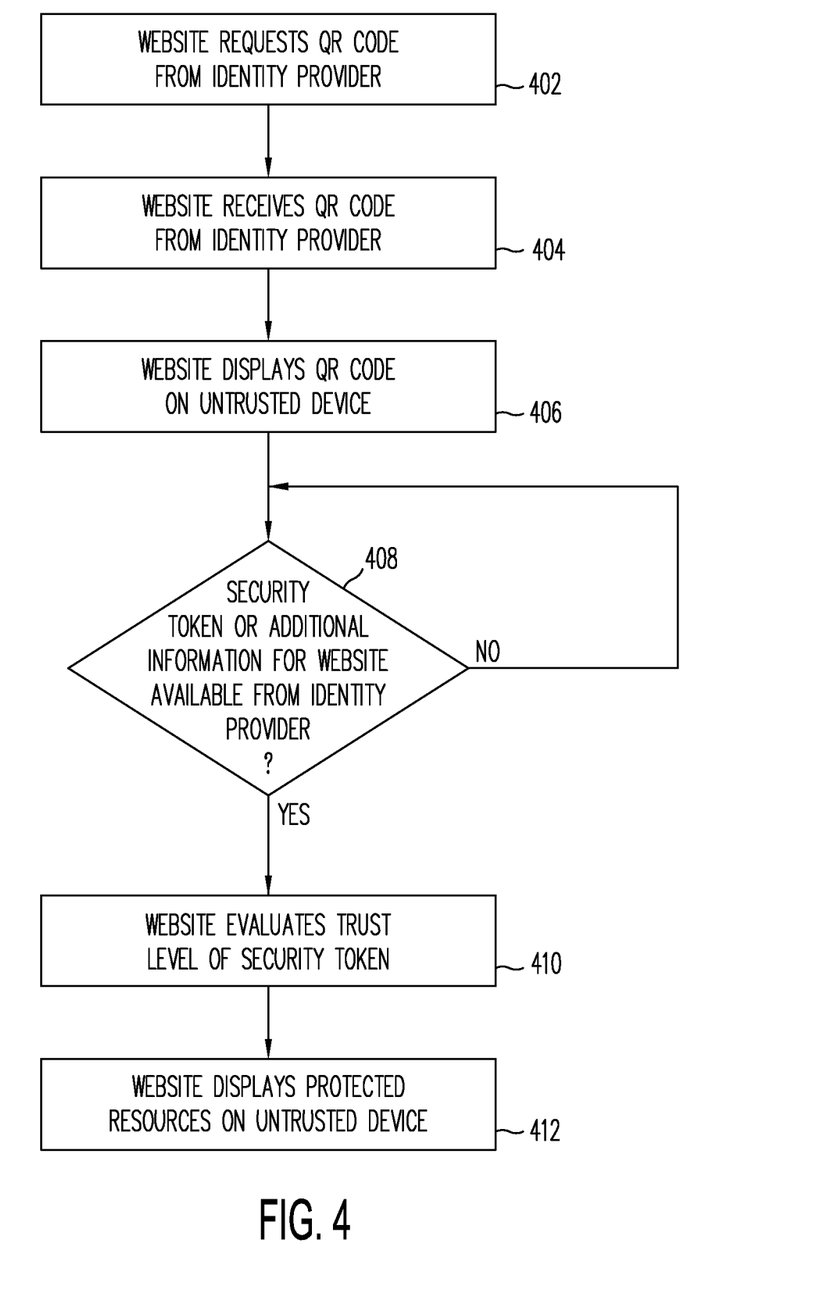
FIG. 4 shows a flow chart of the steps for a website server to request QR code and to receive security token from an identity provider for the website server to login a user or display protected resources to the user according to one or more embodiments of the present disclosure.

FIG. 4 shows a flow chart of the steps for a website server of FIG. 1 to request QR code and to receive security token from an identity provider for the website server to login a user or display protected resources to the user according to one or more embodiments of the present disclosure. Website server 116 may use the QR code when website server 116 requests sensitive information from user 100. For example, website server 116 may use the QR code to allow user 100 to initiate a safe login session using trusted device 102. In one or more embodiments, website server 116 may use the QR code to request credentials for second factor authentication when user 100 has entered login information directly into unsecured device 104. In one or more embodiments, website server 116 may use the QR code to securely collect additional sensitive information when user 100 is already logged into website server 116 to complete a transaction.

In 402, website server 116 requests identity provider 108 to generate a QR code. Website server 116 may provide information that identifies website server 116 and untrusted device 104 to identity provider 108. In addition, website server 116 may provide metadata that identifies the type of information requested by website server 116. Identity provider 108 may generate a QR code that uniquely identifies website server 116 and that ties a transaction for a login session on untrusted device 104 to website server 116.

In 404, website server 116 receives the QR code from identity provider 108. In 406, website server 116 displays the QR code on untrusted device 104. For example, for a safe login session, website server 116 may display the QR code and a "QR code safe login" button on untrusted device 104 to inform users that the QR code may be scanned to initiate a safe login using trusted device 102. In one or more embodiments, website server 116 may display the QR code and a message on untrusted device 104 that user 100 is requested to provide additional information using trusted device 102. If the QR code is used for a safe login session, when user 100 scans the QR code with trusted device 102 using the trusted app from identity provider 108, identity provider 108 may generate a security token for user 100 corresponding to a level of trust. If the QR is used to collect additional information from user 100, when user 100 scans the QR code, identity provider 108 may transact with user 100 to collect the additional information via trusted device 102.

In 408, website server 116 determines if the security token or the additional information is available from identity provider 108. In one or more embodiments, website server 116 may poll identity provider 108. In one or more embodiments, website server 116 may receive a activation command from user 100 that the security token or the additional information is available when user 100 clicks on the QR code displayed on untrusted device 104 as directed by identity provider 108. Website server 116 may retrieve the security token or the additional information. Website server 116 may use the additional information to authenticate user 100 using login authentication unit 120. In one or more embodiments, website server 116 may use the additional information to complete the transaction requiring the information. Website server 116 may proceed to carry out transactions with user 100 on untrusted device 104.

In 410, if the security token was retrieved by website server 116 for a safe login session, login authentication unit 120 may evaluate the security token to determine the protected resources, if any, that may be accessed by user 100. Website server 116 may access protected resource unit 122 to access the protected resources. In 412, website server 116 establishes the safe login session and presents the protected resource on untrusted device 104 for user 100 to access.

Figure 5:
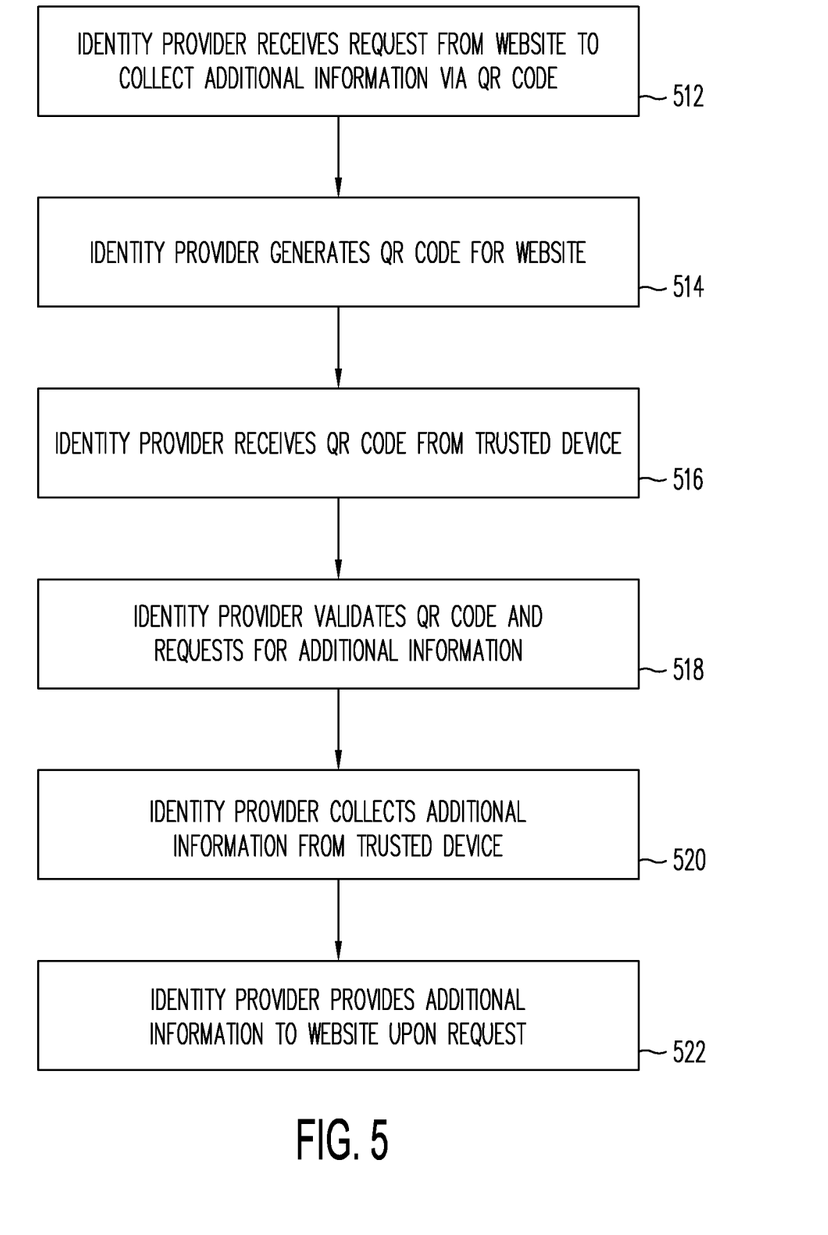
FIG. 5 shows a flow chart of the steps for an identity provider to generate QR code for a website to request additional information from a user and to receive the QR code from a trusted device to provide the requested additional information to the website according to one or more embodiments of the present disclosure.

FIG. 5 shows a flow chart of the steps for an identity provider of FIG. 1 to generate QR code for a website to request additional information from a user and to receive the QR code from a trusted device to provide the requested additional information to the website according to one or more embodiments of the present disclosure. Website server 116 may request the additional information after user 100 is already logged into website server 116.

In 512, identity provider 108 receives a request from website server 116 to generate a QR code to collect additional information from user 100. Identity provider 108 may receive from website server 116 metadata that identifies the type of requested information, in addition to information that identifies website server 116 and untrusted device 104. In 514, identity provider 108 generates a QR code that associates the requested information for a login session on untrusted device 104 with website server 116. Identity provider 108 may transmit the QR code to website server 116. Website server 116 may display the QR code on untrusted device 104 with a notification that user 100 is requested to scan the QR code to provide the information. User 100 may start the trusted app from identity provider 108 on trusted device 102 to scan the QR code.

In 516, identity provider 108 receives the QR code from trusted device 102. Identity provider 108 may decode and/or decrypt the QR code the decoded data. In 518, identity provider 108 validates the QR code to verify that the QR code is associated with a request for information for a login session on untrusted device 104 with website server 116. Identity provider 108 may identify from the metadata the requested information and may transmit a message to trusted device 102 prompting user 100 for the requested information.

In 520, identity provider 108 receives the requested information from trusted device 102. Identity provider 108 may transmit a message to trusted device 102 directing user 100 to instruct website server 116 to retrieve the collected information from identity provider 108, such as by directing user 100 to click on the QR code displayed on untrusted device 104. Upon receiving the command from user 100, website server 116 may request the collected information from identity provider 108. In 522, identity provider 108 provides the requested information to website server 116. Website server 116 may use the information to complete a transaction. User 100 may transact with website server 116 on untrusted device 104 until additional information is required, at which point identity provider 108 may repeat the steps of FIG. 5 to collect the information for website server 116.

Figure 6:
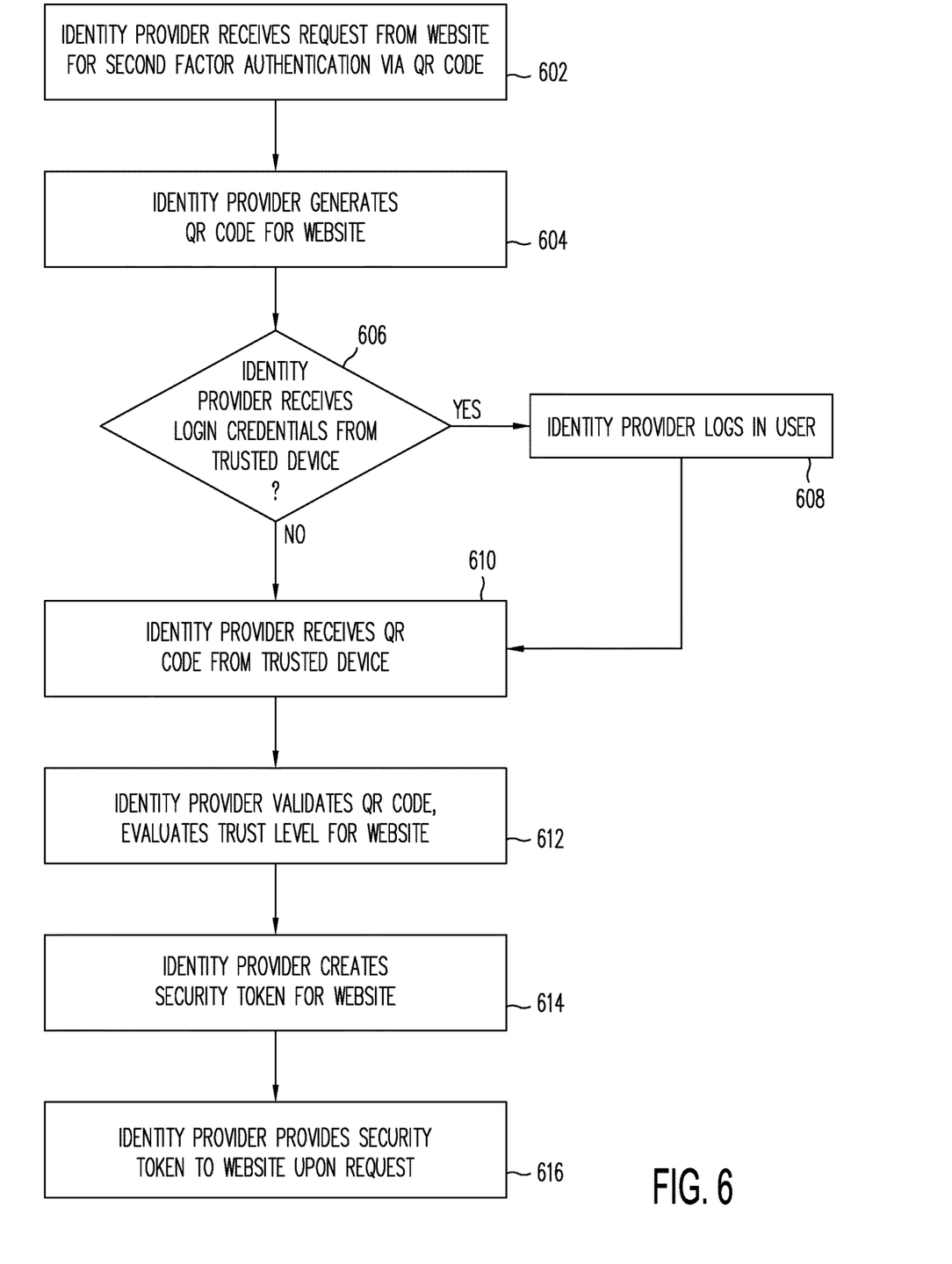
FIG. 6 shows a flow chart of the steps for an identity provider to generate QR code for a website for second factor authentication of a user and to receive the QR code from a trusted device to generate a security token to broker a login to the website according to one or more embodiments of the present disclosure.

FIG. 6 shows a flow chart of the steps for an identity provider of FIG. 1 to generate QR code for a website for second factor authentication of a user and to receive the QR code from a trusted device to generate a security token to broker a login to the website according to one or more embodiments of the present disclosure. Website server 116 may perform second factor authentication after user 100 has entered login information directly into untrusted device 104 so as to increase the trust level of user 100.

In 602, identity provider 108 receives a request from website server 116 to generate a QR code to collect credential information from user 100/trusted device 102 for second factor authentication. Identity provider 108 may receive from website server 116 information identifying website server 116 and untrusted device 104. In 604, identity provider 108 generates a QR code that associates the requested credentials with website server 116. Identity provider 108 may transmit the QR code to website server 116. Website server 116 may display the QR code on untrusted device 104 with a notification that user 100 is requested to scan the QR code to provide the credentials. User 100 may start the trusted app from identity provider 108 on trusted device 102 to scan the QR code. When the trusted app communicates with identity provider 108, a security level is established for user 100 associated with trusted device 102. To increase the security level, user 100 may be prompted to enter login credentials with identity provider 108.

In 606, identity provider 108 determines if user 100 has provided the login credentials from trusted device. If user 100 has provided the login credentials, identity provider 108 authenticates user 100 in 608. Identity provider 108 may increase the security level for user 100 if user 100 is successfully authenticated. In 610, identity provider 108 receives the QR code from trusted device 102. Identity provider 108 may decode and/or decrypt the QR code the decoded data. In 612, identity provider 108 validates the QR code to verify that the QR code is associated with a request for second factor authentication with website server 116. Identity provider 108 may evaluate a level of trust for user 100 based on the characteristics and history of trusted device 102, and the security level of user 100.

In 614, identity provider 108 generates a security token based on the level of trust determined for user 100. Identity provider 108 may transmit a message to trusted device 102 directing user 100 to instruct website server 116 to retrieve the security token from identity provider 108, such as by directing user 100 to click on the QR code displayed on untrusted device 104. Upon receiving the command from user 100, website server 116 may request the security token from identity provider 108. In 616, identity provider 108 provides the security token to website server 116. Website server 116 may evaluate the security token to determine the protected resources, if any, that may be accessed by user 100. Website server 116 establishes the safe login session and presents the protected resource on untrusted device 104 for user 100 to access. Thus, website server 116 may perform second factor authentication for user 100 without requiring user 100 to carry second factor devices such as fobs or other second factor devices.

Figure 7:
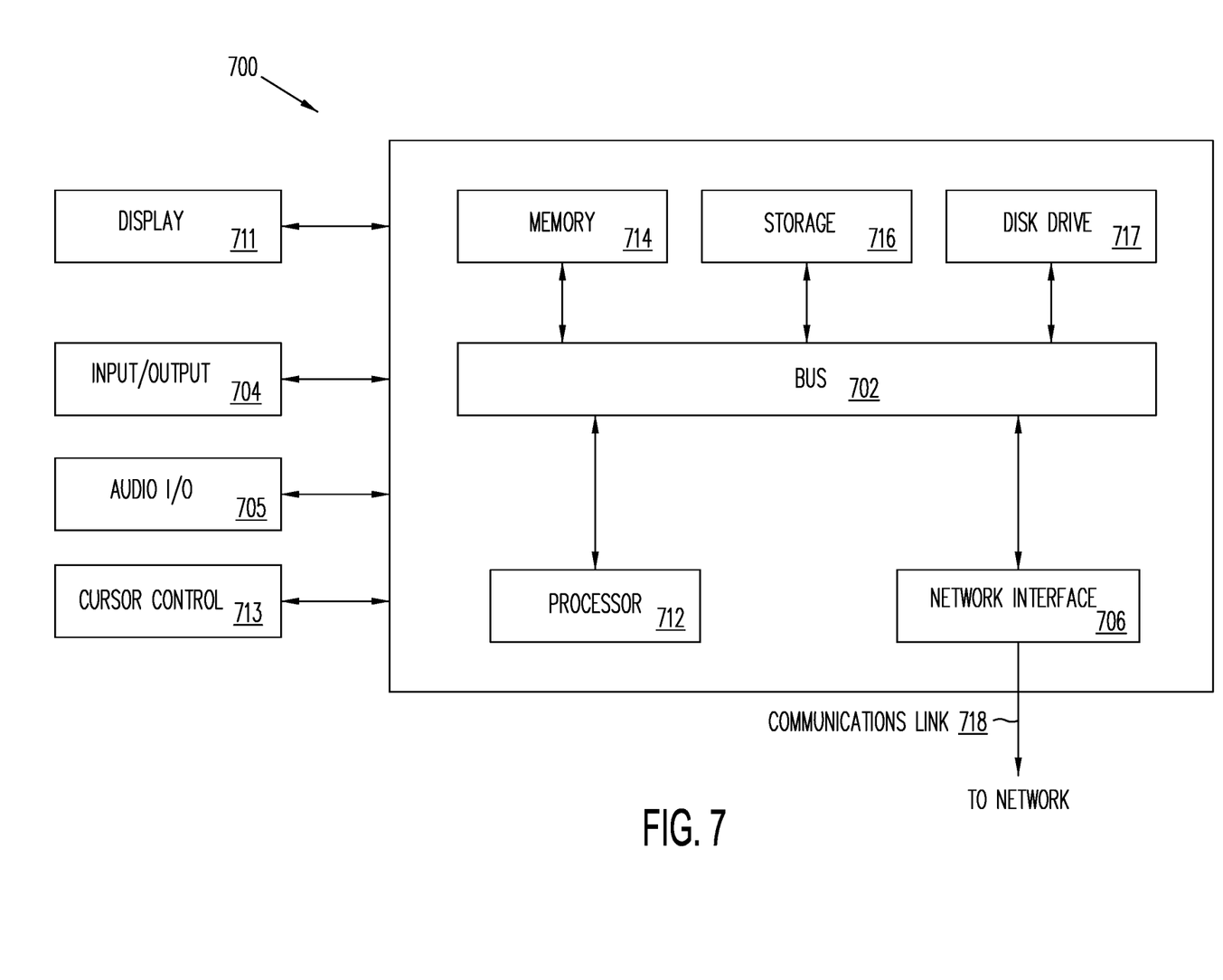
FIG. 7 is a block diagram of a computer system suitable for implementing one or more components discussed herein according to one embodiment of the present disclosure.

FIG. 7 is a block diagram of a computer system 700 suitable for implementing one or more embodiments of the present disclosure. In various implementations, the trusted device of the user may comprise a personal computing device (e.g., smart phone, a computing tablet, a personal computer, laptop, PDA, Bluetooth device, key FOB, badge, etc.) capable of communicating with the network. The website server or the identity provider may utilize a network computing device (e.g., a network server) capable of communicating with the network. It should also be appreciated that the trusted app from the identity provider may be implemented as applications running on computer system 700.

Network computing device may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 7 may be deployed in other ways and that the operations performed and/or the services provided by such servers may be combined or separated for a given implementation and may be performed by a greater number or fewer number of servers. One or more servers may be operated and/or maintained by the same or different entities.

Computer system 700 includes a bus 702 or other communication mechanism for communicating information data, signals, and information between various components of computer system 700. Components include an input/output (I/O) component 704 that processes a user action, such as selecting keys from a keypad/keyboard, selecting one or more buttons or links, etc., and sends a corresponding signal to bus 702. I/O component 704 may also include an output component such as a display 711, and an input control such as a cursor control 713 (such as a keyboard, keypad, mouse, etc.). An optional audio input/output component 705 may also be included to allow a user to use voice for inputting information by converting audio signals into information signals. Audio I/O component 705 may allow the user to hear audio. A transceiver or network interface 706 transmits and receives signals between computer system 700 and other devices, such as another user device, or another network computing device via a communication link 718 to a network. In one embodiment, the transmission is wireless, although other transmission mediums and methods may also be suitable. A processor 712, which can be a micro-controller, digital signal processor (DSP), or other processing component, processes these various signals, such as for display on computer system 700 or transmission to other devices via communication link 718. Processor 712 may also control transmission of information, such as cookies or IP addresses, to other devices.

Components of computer system 700 also include a system memory component 714 (e.g., RAM), a static storage component 716 (e.g., ROM), and/or a disk drive 717. Computer system 700 performs specific operations by processor 712 and other components by executing one or more sequences of instructions contained in system memory component 714. Logic may be encoded in a computer readable medium, which may refer to any medium that participates in providing instructions to processor 712 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 714, and transmission media includes coaxial cables, copper wire, and fiber optics, including wires that comprise bus 702. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 718 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, firmware, or combinations thereof. Also where applicable, the various hardware components, software components, and/or firmware components set forth herein may be combined into composite components comprising software, firmware, hardware, and/or all without departing from the spirit of the present disclosure. Where applicable, the various hardware components, software components, and/or firmware components set forth herein may be separated into sub-components comprising software, firmware, hardware, or all without departing from the spirit of the present disclosure. In addition, where applicable, it is contemplated that software components may be implemented as hardware components, and vice-versa.

Application software in accordance with the present disclosure, such as computer programs executed by a processor of the identity provider to generate/validate QR code and to generate the security token, by a processor of the website server to evaluate the security token to display the protected resources, or by the trusted app to scan the QR code, may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Although embodiments of the present disclosure have been described, these embodiments illustrate but do not limit the disclosure. For example, even though QR code is a mature technology with large information storage capacity, other code, symbols, text, or objects that may be recognized quickly and accurately by trusted devices may be used for the safe login or for the information request. For example, UPC code can be generated by the identity provider, which then can be scanned by the trusted device to accomplish the safe login process or the information request by the website server as discussed herein. It should also be understood that embodiments of the present disclosure should not be limited to these embodiments but that numerous modifications and variations may be made by one of ordinary skill in the art in accordance with the principles of the present disclosure and be included within the spirit and scope of the present disclosure as hereinafter claimed.

We claim:

1. A system, comprising:
    a non-transitory memory comprising instructions; and
    one or more hardware processors coupled to the non-transitory memory and configured to read the instructions to cause the system to perform operations comprising:
        receiving a request to generate a quick response (QR) code from a resource page server;
        in response to receiving the request, generating the QR code and transmitting the QR code to the resource page server, wherein the QR code is displayed on a resource page of an untrusted device;
        in response to receiving information corresponding to the QR code from a trusted device of a user, validating the QR code and determining a trust level for the user; and generating a token corresponding to the determined trust level for the user, wherein the token provides access to an amount of resources provided by the resource page server, the amount of resources corresponding to the determined trust level of the user.

2. The system of claim 1, the operations further comprising:
transmitting the token to the resource page server.

3. The system of claim 2, wherein the transmitting the token to the resource page server causes the resource page server to provide the user with access to one or more secure resources based on the determined trust level of the user.

4. The system of claim 1, wherein the validating the QR code includes determining that a time stamp corresponding to the QR code has not expired and identifying that the QR code corresponds to the resource page server.

5. The system of claim 1, wherein the determining the trust level of the user is based on a security level of the user, whether there is any identified fraudulent activity associated with the trusted device of the user, and whether the user has provided additional information.

6. The system of claim 5, wherein the additional information includes login credentials.

7. The system of claim 1, the operations further comprising:
in response to receiving the information corresponding to the QR code from the trusted device of the user, determining if additional information is needed from the user, wherein the additional information includes login credentials.

8. A non-transitory machine-readable medium having stored thereon machine-readable instructions executable to cause a machine to perform operations comprising:
receiving a request to generate a quick response (QR) code from a resource page server;
in response to receiving the request, generating the QR code and transmitting the QR code to the resource page server, wherein the QR code is displayed on a resource page of an untrusted device;
in response to receiving information corresponding to the QR code from a trusted device of a user, validating the QR code and determining a trust level for the user; and
generating a token corresponding to the determined trust level for the user, wherein the token provides access to an amount of resources provided by the resource page server, the amount of resources corresponding to the determined trust level of the user.

9. The non-transitory machine-readable medium of claim 8, the operations further comprising:
transmitting the token to the resource page server.

10. The non-transitory machine-readable medium of claim 9, wherein the transmitting the token to the resource page server causes the resource page server to provide the user with access to one or more secure resources based on the determined trust level of the user.

11. The non-transitory machine-readable medium of claim 8, wherein the validating the QR code includes determining that a time stamp corresponding to the QR code has not expired and identifying that the QR code corresponds to the resource page server.

12. The non-transitory machine-readable medium of claim 8, wherein the determining the trust level of the user is based on a security level of the user, whether there is any identified fraudulent activity associated with the trusted device of the user, and whether the user has provided additional information.

13. The non-transitory machine-readable medium of claim 12, wherein the additional information includes login credentials.

14. The non-transitory machine-readable medium of claim 8, the operations further comprising:
in response to receiving the information corresponding to the QR code from the trusted device of the user, determining if additional information is needed from the user, wherein the additional information includes login credentials.

15. A method, comprising:
receiving, by an identity provider server, a request to generate a quick response (QR) code from a resource page server;
in response to receiving the request, generating, by the identity provider server, the QR code and transmitting the QR code to the resource page server, wherein the QR code is displayed on a resource page of an untrusted device;
in response to receiving information corresponding to the QR code from a trusted device of a user, validating, by the identity provider server, the QR code and determining a trust level for the user; and
generating, by the identity provider server, a token corresponding to the determined trust level for the user, wherein the token provides access to an amount of resources provided by the resource page server, the amount of resources corresponding to the determined trust level of the user.

16. The method of claim 15, further comprising:
transmitting, by the identity provider server, the token to the resource page server.

17. The method of claim 16, wherein the transmitting the token to the resource page server causes the resource page server to provide the user with access to one or more secure resources based on the determined trust level of the user.

18. The method of claim 15, wherein the validating the QR code includes determining that a time stamp corresponding to the QR code has not expired and identifying that the QR code corresponds to the resource page server.

19. The method of claim 15, wherein the determining the trust level of the user is based on a security level of the user, whether there is any identified fraudulent activity associated with the trusted device of the user, and whether the user has provided additional information.

20. The method of claim 19, wherein the additional information includes login credentials.

* * * * *